Figure 2:
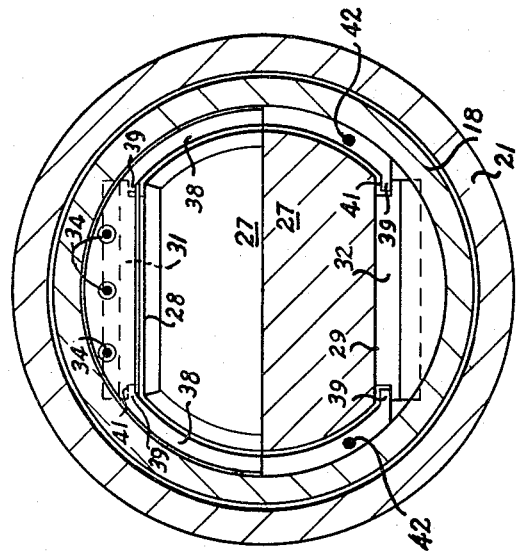

June 27, 1967  W. P. AMEND ETAL  3,327,497
COUPLING
Filed Aug. 9, 1965

INVENTORS
WILLIAM P. AMEND &
WILLIAM D. GOODBERLET DECD
BY GLADYS C. GOODBERLET Executrix BY *Henry C. Westin*
THEIR ATTORNEY

United States Patent Office 3,327,497
Patented June 27, 1967

3,327,497
COUPLING
William Phillip Amend, Coraopolis, Pa., and William Donald Goodberlet, deceased, late of Pittsburgh, Pa., by Gladys C. Goodberlet, executrix, Pittsburgh, Pa., assignors to United Engineering and Foundry Company, Pittsburgh, Pa., a corporation of Pennsylvania
Filed Aug. 9, 1965, Ser. No. 479,053
Claims priority, application Great Britain, Aug. 10, 1964, 32,557/64
5 Claims. (Cl. 64—9)

The present invention relates to a coupling and, more particularly, to a coupling provided for transferring the driving torque to a shaft element, such as a roll of a rolling mill.

In recent rolling mills and, particularly, cold tandem mills, employment of gear-type couplings has been favored. One illustration of such a gear-type coupling is given in U.S. Patent No. 2,845,781 which issued to J. W. O'Brien on Aug. 5, 1958, entitled, "Universal Coupling." While not so limited, the present invention is particularly useful in connection with a gear-type coupling of the type illustrated in the aforesaid O'Brien patent. This coupling basically comprises an internal member having an enlarged diameter portion on which external gear teeth are formed, which teeth mesh with similar internal gear teeth formed on an external member of the coupling.

It is customary to connect to the internal member of the coupling a spindle which is associated with the gear drive or motor that furnishes the driving torque to the mill. The external member of the coupling receives the adjacent end of the roll of the mill. The interior of the external member of the coupling is provided with flat driving surfaces which engage similar surfaces formed on the end of the roll when in the driving relationship. In this relationship there is provided sufficient clearance between the driving surfaces of the coupling and roll to insure that the roll may be quickly inserted into and removed from the coupling. The provision of such a clearance, which heretofore was found necessary, allows for undesirable chatter of the parts and excessive inertia loading on the gear teeth and other components due to the inherent changing of speed of the coupling parts.

There have been to the knowledge of the applicants two known attempts to alleviate the aforesaid condition and attendant problems. One suggestion was to provide in the external coupling member cams which were formed with cylindrical surfaces generated about a radius concentric with the radius of the coupling which was received in a bore formed in the coupling member, the bore, however, having non-concentric surfaces. This dissimilar cylindrical condition caused the cams to act like keys on the rotation of the coupling, thus eliminating the clearance between the end of the roll and the coupling between which the cams were interposed. However, it was found in experience that upon the occurrence of a change in speed, the cams would tend to disengage themselves from contact with the roll. This, of course, introduced chattering and excessive loads upon the teeth of the coupling. Moreover, in order to disengage the roll from the coupling, it was found necessary to reverse the driving mechanism in order to free the roll from the coupling. This additional step is quite objectionable in effecting quick and automatic changing of the rolls which has now become mandatory in certain types of mills.

A second known suggestion to take up the clearance provided between the end of the roll and the associated coupling member was to provide in place of the cams, previously referred to, tapered wedges arranged on diametrically opposed sides of the coupling, against which the end of the roll was adapted to be brought into engagement after it is inserted into the coupling. This suggested solution to the problem had the serious disadvantage of necessitating manual operative means to effect a relative movement between the wedges and the end of the roll in order that the roll could be removed from the coupling to facilitate roll changes. Not only was this a cumbersome procedure, taking up an objectionable amount of valuable time, but it did not lend itself to the automatic changing of the rolls which, as above noted, in certain types of mills is now a mandatory procedure.

The present invention provides a coupling capable of automatically taking up the clearance between the roll and coupling in a manner which is free from the objections found in the known coupling designed to provide a positive relationship between the roll and coupling.

More particularly, the present invention provides a coupling, for example, a gear-type coupling, including at least two diametrically opposed keys, one surface of which is flat and non-tapered and a second surface of which is provided with a taper which corresponds with a similar taper formed eihter on the roll or on the interior of the coupling member to which the roll is associated, yieldable means is provided for urging the keys axially so that when the roll is removed from the coupling, the keys are urged outward of the coupling, thereby increasing the opening and allowing easy insertion of the roll on to the coupling, and wherein when the roll is inserted into the coupling, the roll itself will cause the keys to slide up upon the tapered surfaces, compressing the yieldable means and taking up all clearance between the coupling, key and roll.

It is also a feature of the present invention to provide means for preventing the keys from falling out of the coupling, particularly when the coupling is stopped when one of the keys is at the top thereof.

As previously indicated, the present invention lends itself very well to operation with a gear-type coupling and particularly with a coupling provided with means for urging the external coupling member axially thereof relative to the internal member in order to cause contact between certain parts, which contact is employed to prevent the free coupling member from falling when the roll is removed. In this connection the means for urging the external coupling member axially is also utilized to urge the external member in a direction so that the keys are continuously forced against the end of the roll, thereby assuring that a positive driving relationship is maintained between the roll, keys and external coupling member.

Figure 1:
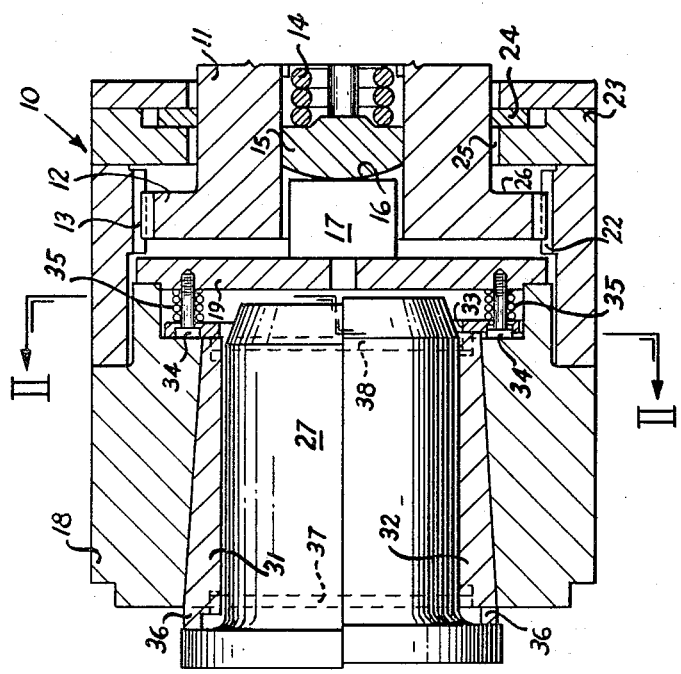

These objects as well as various other features and advantages of the present invention will be better understood when the following specification is read along with the accompanying drawings of which:

FIGURE 1 is a sectional view taken through a gear-type coupling incorporating the features of the present invention, and FIGURE 2 is a sectional view taken on lines II—II of FIGURE 1.

With reference to the drawings there is provided a gear-type coupling, consisting of an internal member 11 having a cylindrical enlarged diameter hub 12 on the outer surface of which there is machined gear teeth 13, the hub being fastened to the member 11 for rotation therewith. The member 11 actually constitutes, in the illustrated form a portion of the mill spindle, the other end, not shown, will be connected to a similar gear-type coupling to which the driving torque from a gear drive or a motor will be supplied. At the center of the member 11 there is provided concentric with its center a heavy compression spring 14, one end of which engages a spring retainer 15 which is adapted to slide axially relative to the center of the internal gear member 11, the surface of the retainer 15 opposite the spring being relieved at 16 to provide a line contact with an axially arranged button 17 which is urged axially by the retainer 16 under the influence of the energy of the spring 14.

The button 17, as illustrated in FIGURE 1, actually constitutes a part of an external member 18 of the gear-type coupling and in which regard, it is connected to a ring 19. The ring at its outer extremity is bolted to the external member 18 so that any displacement of the button and, hence, the ring 19 will cause an axial displacement of the external member 18 relative to the member 11. In a direction toward the internal member 11, the external member 18 of the coupling is secured to a ring 21 having at its inner surface internally machined teeth 22 which mesh with the teeth 13 of the internal member 11. The teeth 22, as shown in FIGURE 1, are considerably longer in length than the teeth 13 which assures contact even though there may exist axial movement between the two members. The assembly includes a third ring 23 which serves the dual function of carrying lubrication seals 24 and having a surface 25 directly opposite to a surface 26 formed on the hub 12 to prevent the member 18 from falling when there is no roll in the coupling. This is accomplished by the surface 25, upon axial movement of the external member 18 through the agency of the spring 14 forcibly contacting the surface 26, whereby the coupling member 18 is prevented from falling out of its operative position. Thus, it will be noted that this position is maintained when the roll, a portion of which is shown in FIGURE 1 at 27, is removed from the coupling. This feature is disclosed in the aforesaid O'Brien patent.

Drawing your attention now to the roll end of the external coupling member 18, as previously noted, there is shown in FIGURE 1 a portion of the roll 27 which is inserted in the coupling member 18. In this regard it will be noted that the roll end, as best seen in FIGURE 2, is provided with opposite flat surfaces 28 and 29. These surfaces are machined substantially parallel to the axis of the roll and are adapted to engage the inner surfaces of oppositely arranged keys 31 and 32. These keys are thus interposed between the roll 27 and the coupling member 18. As best shown in FIGURE 1, the outer surfaces of the keys 31 and 32 are provided with tapers, which in the illustrated form amout to approximately six degrees generated from a point opposite the roll end of the coupling. Similar tapered surfaces 31 are provided at the adjacent sides of the coupling member 18.

As FIGURE 1 best shows, at the inner end of the keys 31 and 32, there is provided in engagement with the vertical surface of the keys, a ring 33, which ring is carried by a number of bolts 34 which are fastened to the ring 19. The ring 33 is allowed to move axially over the bolts 34 and is biased toward the roll by the springs 35 carried by each of the bolts 34. Thus, under the influence of the springs 35, the ring 33 will urge the keys outward of the external coupling member 18 so that when the roll 27 is removed from the coupling, the keys will assume a position toward the left as one views FIGURE 1, in which position there is provided an increased opening and, hence, a maximum clearance between the roll and the opening formed between the keys 31 and 32. This allows quick entry of the roll into the opening formed by the keys when the roll is inserted into the coupling member 18. As the roll continues to be moved toward the coupling, the roll will engage projection 36 formed on the outward end of the coupling member 18 and so doing will force the keys into the coupling member 18 against the resistance of the springs 35 and at the same time the keys will take up all clearance between the roll, keys and coupling member 18.

During the operation of the mill wherein the roll will be in the position shown in FIGURE 1, the spring 14, as previously noted, will urge the ring 19 and, hence, the coupling member 18 in the direction toward the roll continuously forcing the keys 31 and 32 into positive contact with the roll 27. This influence will prevent any tendency of a clearance being established between the roll and keys on the experience of a change in speed or other influences tending to move the various elements relative to each other during the operation of the mill.

There is one other feature of the illustrated coupling, which constitutes a part of the present invention, that requires description. With reference to FIGURE 2 there is shown at the two ends of the keys 31 and 32 holders 37 and 38. As shown, these holders take a somewhat cylindrical shape and are provided with projections 39 at their ends which fit into slots 41 formed on the end and at the inner portion of the keys 31 and 32. The holders are connected to the coupling by a series of bolts 42 so that should the coupling be stopped in the position shown in FIGURE 2 with one of the keys at the top of the coupling, it would be prevented from falling down by reason of the contact between the projections 39 and the keys. It will be noted in FIGURE 1 that there are actually two pairs of holders provided for the keys, one at the front and the other at the back of the keys.

While the operational phase of the various components have already been discussed, it may be well to emphasize that when the roll is in its operative position as shown in FIGURE 1, and it is desired to remove the roll 27 from the coupling to effect roll change, the roll in a customary manner will be bodily removed axially of the coupling, which action will cause the roll and keys 31 and 32 to move relative to the extrenal member 18 in opposition to the influence of the spring 14, but aided by the influence of the springs 35. As the roll thus moves axially away from the coupling member 18, a clearance will be quickly established between the roll 27 and the adjacent faces of the keys 31 and 32, so that then the keys will be urged outward of the member 18 under the influence of the springs 35.

As previously noted, while the present invention has been illustrated in conjunction with the gear-type coupling of the type illustrated in the aforesaid O'Brien patent, and in connection with a roll, its features can be just as well incorporated in the types of couplings and for rotating elements where there is need for automatically taking up the clearance between driving and driven members.

In accordance with the provisions of the patent statutes, we have explained the principle and operation of our invention and have illustrated an described what we consider to represent the best embodiment thereof. However, we desire to have it understood that within the scope of the appended claims, the invention may be practiced otherwise than as specifically illustrated and described.

We claim:

1. A coupling for joining together a torque delivery shaft with a troque receiving shaft wherein during operation the coupling is subject to a variable torque, comprising:

a coupling member having its axis of rotation substantially coaxial with at least one of said shafts, means for drivingly connecting said torque delivery shaft with one end of said coupling member, said coupling member having an axially extending recess at its other end adapted to receive a portion of said torque receiving shaft, said coupling member including internally longitudinal opposed plane surfaces formed in said recess, said plane surfaces being tapered in a direction such that the distance between the surfaces progressively diminishes inwardly of the recess, longitudinally tapered keys carried by said coupling member each having a first surface engageable with one of said plane surfaces and a second surface engageable with said portion of said torque receiving shaft, said keys having end portions extending outwardly of said coupling member and engageable with said torque receiving shaft for displacing the keys relative to the coupling member, the construction and cooperative relationship of the said coupling member, keys and torque receiving shaft being such that insertion of the torque receiving shaft into coupling member displaces the keys inwardly of the coupling member, thereby reducing the distance between the keys until the torque receiving shaft is clamped in a positive metal-to-metal relationship with the coupling member by said keys, said coupling member including guiding means for said keys allowing longitudinal movement thereof in a direction inward of said recess until the clamped condition is obtained, and resilient means located outside of said recess engaging with said coupling member and arranged to exert a force on said coupling member in a direction toward said torque receiving shaft and on said keys in a direction away from said torque receiving shaft and sufficient to maintain said positive metal-to-metal relationship between said coupling member, keys and torque receiving shaft when the coupling is subject to the varying torque conditions.

2. In a coupling according to claim 1 in which said guide means includes cooperating surfaces formed on said keys and said coupling member for retaining said keys in said member while permitting axial movement during removal and insertion of the torque receiving shaft.

3. A coupling according to claim 1, further comprising:

other resilient means for displacing each of said keys outward of said coupling member and relative thereto, and stop means for limiting the amount of displacement of said keys by said other resilient means.

4. A coupling for joining together a spindle shaft with a torque receiving shaft wherein the coupling is subject to a variable torque comprising:

a coupling member having its axis of rotation substantially coaxial with said torque receiving shaft, said coupling member having an axially extending opening into which is received and secured to said coupling member a plate member arranged to divide the opening into first and second recesses, said coupling member including gear teeth projecting into said first recess adapted to mesh with gear teeth formed on said spindle shaft, said coupling member including longitudinally opposed plane surfaces formed in said second recess, said plane surfaces being tapered in a direction such that the distance between the surfaces progressively diminishes inwardly of the second recess, longitudinally tapered keys carried by said coupling member each having a first surface engageable with one of said plane surfaces and a second surface engageable with said portion of said torque receiving shaft, said keys having end portions extending outwardly of said coupling member and engageable with said torque receiving shaft for displacing the keys relative to the coupling member, first resilient means located between said plate and said keys for initially displacing the keys outward of said second recess preparatory to receiving the torque receiving member, the construction and cooperative relationship of the said coupling member, keys and torque receiving shaft being such that insertion of the torque receiving shaft into coupling member displaces the keys inwardly of the coupling member, thereby reducing the distance between the keys until the torque receiving shaft is clamped in a positive metal-to-metal relationship with the coupling member by said keys, said coupling member including guiding means for said keys allowing longitudinal movement thereof in a direction inward of said recess until the clamped condition is obtained, and second resilient means carried by the spindle shaft arranged to exert a force on the coupling member in a direction toward the torque receiving shaft and on said keys in a direction opposite to the force exerted by said first resilient means and sufficient to maintain said positive metal-to-metal relationship between said coupling member, keys and torque receiving shaft when the coupling is subject to the varying torque conditions.

5. A coupling for joining together a torque delivery shaft with a torque receiving shaft wherein during operation the coupling is subject to a variable torque, comprising:

a coupling member having its axis of rotation substantially coaxial with at least one of said shafts, means for drivingly connecting said torque delivery shaft with one end of said coupling member, said coupling member having an axially extending recess at its other end adapted to receive a portion of said torque receiving shaft, said coupling member including internally longitudinal opposed plane surfaces formed in said recess, said plane surfaces being tapered in a direction such that the distance between the surfaces progressively diminishes inwardly of the recess, longitudinally tapered members each having a tapered plane surface complementary to one of said plane surfaces formed in said recess, said torque receiving shaft being constructed when inserted on said recess to effect relative movement between said tapered member and said coupling member, and to carry said tapered member during operation of the coupling, the construction and cooperative relationship of said coupling member, tapered members and torque receiving shaft being such that insertion of the torque receiving shaft into said coupling member continues until said plane surfaces and said tapered plane surfaces engage each other and the torque receiving shaft is clamped in a positive metal-to-metal relationship with the coupling member by said tapered members, and resilient means located outside of said recess engaging with said coupling member and arranged to exert a force on said coupling member in a direction toward said torque receiving shaft and sufficient to maintain said positive metal-to-metal relationship when the coupling is subject to the varying torque conditions.

References Cited

UNITED STATES PATENTS 2,845,781  8/1958  O'Brien _____ 64—9
3,222,884  12/1965  Lyle _____ 64—1

FRED C. MATTERN, JR., *Primary Examiner.*

HALL C. COE, *Examiner.*